(No Model.)
O. C. DONECKER.
WOOD FLUTING MECHANISM.
No. 324,669. Patented Aug. 18, 1885.
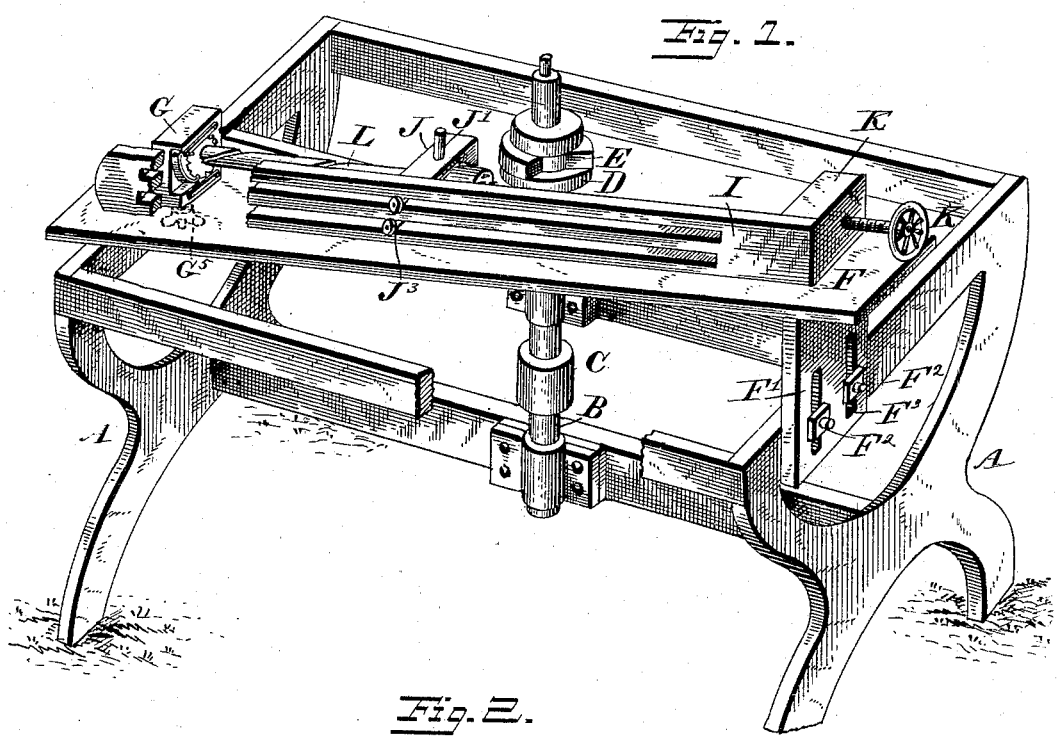
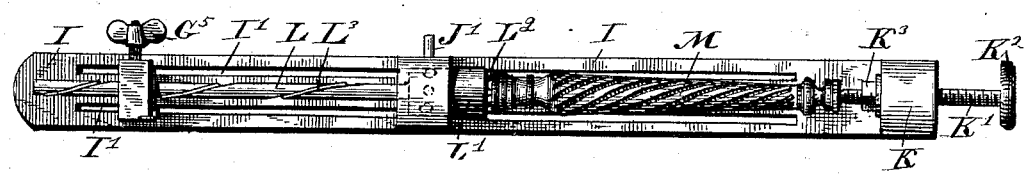
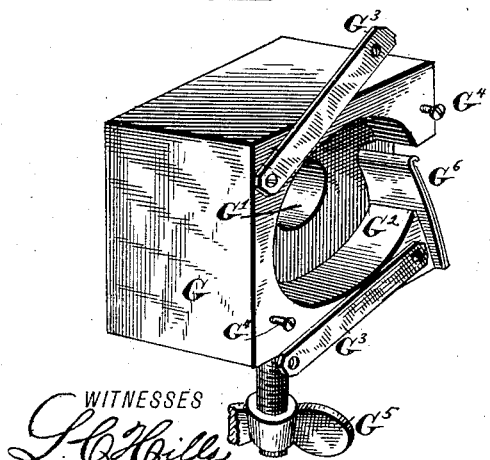
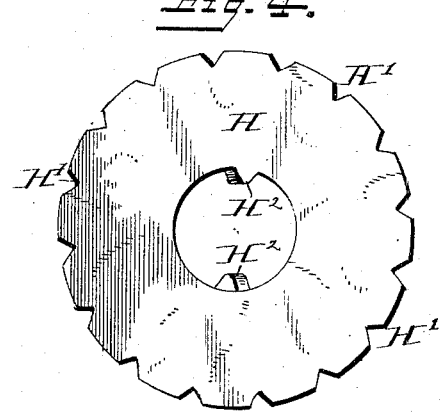
WITNESSES
L. C. Hills
W. L. Duvall
INVENTOR
Orin C. Donecker
By E. B. Stoeking
Atty.

UNITED STATES PATENT OFFICE.

ORIN C. DONECKER, OF ALLENTOWN, PENNSYLVANIA, ASSIGNOR TO ELI J. SCHNECK AND GEORGE H. BEAR, OF SAME PLACE.

WOOD-FLUTING MECHANISM.

SPECIFICATION forming part of Letters Patent No. 324,669, dated August 18, 1885.

Application filed June 9, 1885. (No model.)

*To all whom it may concern:*

Be it known that I, ORIN C. DONECKER, a citizen of the United States, residing at the city of Allentown, in the county of Lehigh and State of Pennsylvania, have invented certain new and useful Improvements in Fluting Attachments, of which the following is a specification, reference being had to the accompanying drawings.

This invention has relation to an attachment for ordinary forming-machines, to serve the purpose of fluting table-legs, stair-posts, and other similar turned work, the object of the invention being to provide an attachment which will permit fluting in either straight or spiral lines equidistant from each other and in accordance with various designs; and the invention consists in certain features of construction hereinafter described, and particularly pointed out in the claims.

Referring to the drawings, Figure 1 is a perspective of the attachment applied to an ordinary forming-machine. Fig. 2 is a front elevation of the attachment. Fig. 3 is a perspective of the fixed nut-stock detached, and Fig. 4 is a full-size elevation of the nut detached from its stock.

Like letters indicate like parts in all the figures.

The former may be of any known construction. In this instance there is illustrated the frame-work A, the vertical spindle B, having the belt-pulley C, and rotary cutter-head D, having knives E, mounted vertically in the frame-work and adapted to be revolved therein, all of which is of the usual construction and forms no part of my invention.

Upon the frame-work I support a board or table, F, one end of which rests upon a standard, F', adjustably secured to the frame-work of the former by bolts and nuts $F^2$, passing through slots $F^3$, formed in the standard, so that the inclination of the board or table F may be varied as desired.

At the left of the table is a fixed stock, G, (see Fig. 3,) having an aperture, G', for the pattern-spindle of the attachment, and a circular recess, $G^2$, to receive the pattern-nut H, the recess $G^2$ being of a diameter and depth equal to the diameter and thickness of the pattern-nut, so that the latter may be inserted into the stock, and yet be capable of rotation therein, having its bearing on its periphery or upon the spindle.

After the insertion of the nut within the recess of its stock the retaining-bars $G^3$ are swung across the face of the nut and retained in that position by the screws $G^4$. A thumb-screw, $G^5$, projects from the bottom of the nut and passes through the table F, so as to retain the nut against longitudinal movement, and yet permit of its oscillation to give a lateral or swinging movement to the opposite end of the attachment. The periphery of the nut H is provided with notches H', arranged at such distances apart as required to produce parallel lines or fluting in the work, either spirally or straight, as desired, in a manner hereinafter described. The nut H is perforated centrally for the reception of the pattern-spindle, and provided in this instance with two oppositely-inclined threads, $H^2$, arranged diametrically opposite each other. If desired, the spindle may be polygonal in cross-section and the nut adapted to it.

The remaining portions of the attachment rest movably upon the board F, and comprise a base, I, which is longitudinally slotted, as at I', to permit of longitudinal adjustment thereon of a tail-stock, J. At the extreme end of the base is a head-stock, K, having an adjustable center, K', which has a screw-threaded bolt pointed at one end, and having a hand-wheel, $K^2$, at the other, which bolt is threaded in the head-stock, and has upon one surface thereof a set-nut, $K^3$. In the tail-stock is mounted the pattern-spindle L, having a head, L', provided with spurs $L^2$, for holding work and causing it to revolve with the spindle, as is usual in wood-turning lathes. The tail-stock is recessed, as shown in dotted lines, Fig. 2, to receive the head L' of the spindle, and within the recess said head is provided with holes, as shown by dotted lines, to receive a pin, or it may be a spring, J, for a purpose hereinafter described.

This being the construction, the operation is as follows: A properly-shaped stick—for instance, a table-leg, M, Fig. 2—is inserted between the head L' and the center K', as in an ordinary lathe. The fixed nut-stock is secured to the board, as shown in Fig. 1, so that the attachment may be swung upon the nut $G^5$ as a center toward and away from the cutter-head D, to follow the taper of the work, while at the same time the entire attachment may be reciprocated longitudinally upon the board, the pattern-spindle L passing through the nut H, which, being fixed, causes said spindle to rotate by reason of the spiral female threads or grooves $L^3$ formed therein, the pitch or inclination of the spiral being such as is desired in the flute of the work M.

Projecting into the recess $G^2$ of the stock G is a spring, $G^6$, which is adapted to take into the notches H' of the nut H, so that after reciprocating the attachment, as before described, with the work in contact with the revolving cutter to form one spiral groove or flute in the work, the spindle, together with the work, is rotated until the spring $G^6$ falls into a different notch in the periphery of the nut, when the attachment is again reciprocated, with the work, in contact with the cutter, this latter operation producing a second spiral groove or fluting parallel to the first formed. In this manner a series of grooves parallel with each other and spirally disposed are formed in the work.

When it is desired to produce straight fluting, the pin J' is inserted through the wall of the tail-stock and into the holes of the spindle-head L' to prevent the spindle, its head, and the work from rotating while the attachment is reciprocated longitudinally with the work in connection with the cutter. In this case the spring $G^6$ is removed from connection with the nut.

By varying the inclination of the table F the shape of the cut made by the knives E may also be varied, so as to produce either a regular groove of curved outline in cross-section, or of greater or less eccentricity in said outline; and by changing the character of the knives E, grooves of different outline in cross-section and different eccentricity or undercut may be produced, these effects being limited only by the skill and judgment of the operator.

The tail-stock J, being adjustably secured to the base by means of the screws or bolts $J^3$, may be moved toward and from the head-stock K, to adapt the attachment to receive longer or shorter pieces of work M.

Having described the invention, what is claimed is—

1. A fluting attachment of the character described, comprising a movable slotted base, a tail-stock adjustably mounted thereon, a fixed head-stock having a center, a pattern-spindle having a spurred head, and a relatively-fixed pattern-nut, in combination with the table and the cutter-head of a former, substantially as specified.

2. In combination with the board F, fixedly mounted upon a former and in suitable relation with its cutter-head, a fixed nut-stock pivotally attached to the board, and a movable fluting attachment the pattern-spindle of which is adapted to reciprocate through said nut, substantially as specified, whereby when said attachment is moved the pattern-spindle and work are rotated.

3. The combination, with a cutter-head of an ordinary former, of an adjustably-inclined table or board having pivotally secured thereto a pattern-nut stock provided with a nut-retaining spring, a reciprocating fluting attachment having a grooved pattern-spindle adapted to fit the nut, and a head stock and center for holding work in connection with the spindle, substantially as specified.

4. The combination of the nut H, provided with the oppositely-inclined threads $H^2$ and peripherical pattern-notches H', with the nut-stock G, fixedly mounted on a former, having the recess $G^2$, aperture G', spring $G^6$, and retaining-bars $G^3$, with a movable fluting attachment having the pattern-shaft L, substantially as shown and described.

5. The combination of the board F, secured to a former, the stock G, having the thumb-screw $G^5$ for pivotal attachment to the board F, the nut H, mounted in the stock G, the spindle L, the adjustable tail-stock J', the head-stock K, forming a movable attachment, and the adjustable bracket F', for urging the inclination of board F, substantially as shown and described.

In testimony whereof I affix my signature in presence of two witnesses.

ORIN C. DONECKER.

Witnesses:
JACOB D. BURGER,
EDWARD H. RENINGER.